March 1, 1955 J. A. AMORI 2,703,126
HAND-FED FRUIT HALVING MACHINE
Filed Nov. 25, 1952 2 Sheets-Sheet 1
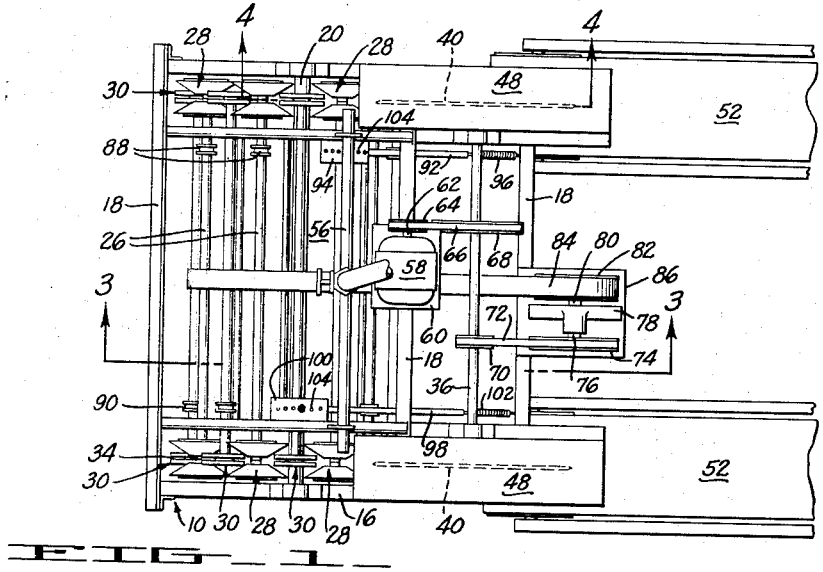
FIG_1_
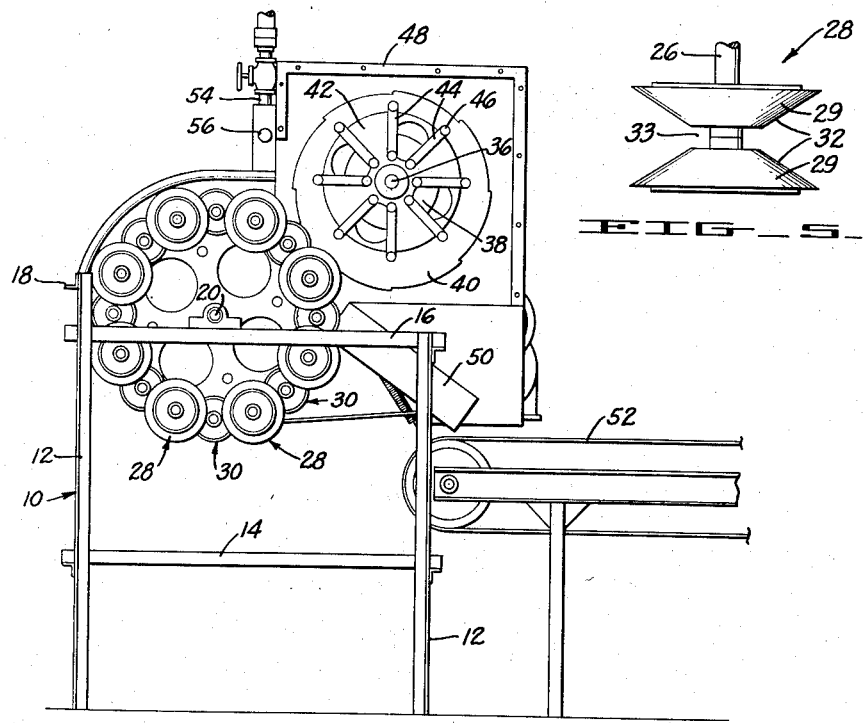
FIG_2_
INVENTOR.
Joseph A. Amori
BY Naylor and Lassagne
ATTORNEYS March 1, 1955 J. A. AMORI 2,703,126
HAND-FED FRUIT HALVING MACHINE
Filed Nov. 25, 1952 2 Sheets-Sheet 2
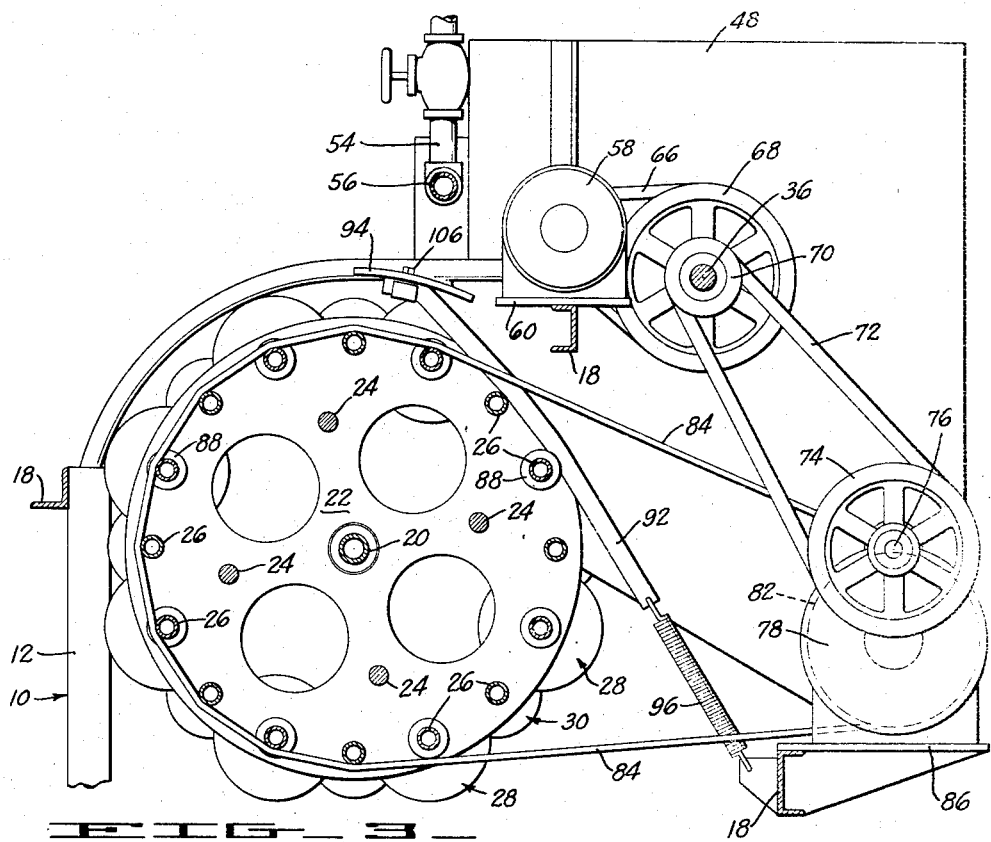
FIG_3_
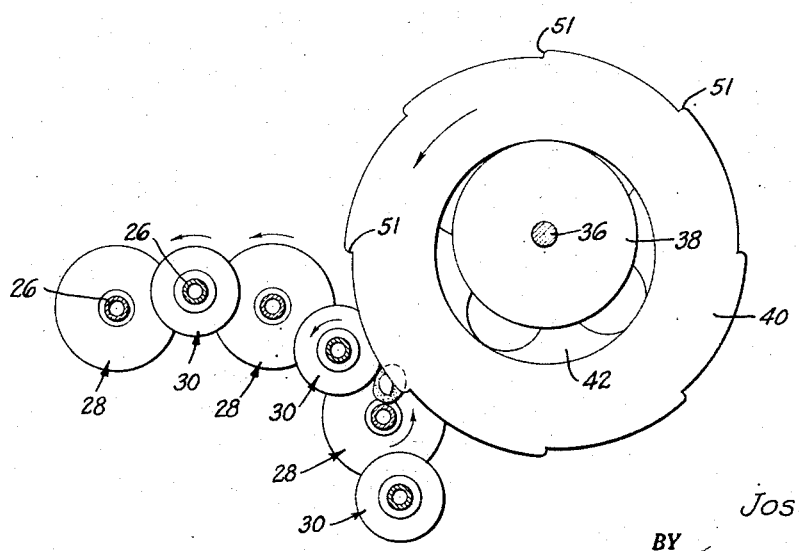
FIG_4_
INVENTOR.
Joseph A. Amori
BY
ATTORNEYS

United States Patent Office 2,703,126
Patented Mar. 1, 1955

2,703,126

HAND-FED FRUIT HALVING MACHINE

Joseph A. Amori, San Jose, Calif.

Application November 25, 1952, Serial No. 322,516

7 Claims. (Cl. 146—73)

This invention relates to food processing machinery, and more particularly to a semi-automatic machine adapted for the halving of fruit, such as apricots, peaches, and the like, which may be fed into the machine manually.

An object of the invention is to provide a simple, inexpensive, light weight fruit halving machine which may be easily transported from place to place to enable individual growers to perform their fruit halving operations at the particular ranch or orchard where the fruit is grown, thus enabling these individual fruit growers to eliminate the substantial expense involved in shipping their produce to large and centrally located fruit processing installations.

A further object of the invention is to provide a compact fruit halving machine embodying roller-type fruit orienting and conveying pockets and a rotatable cutter positionally related to the conveyor means in such manner as to not only bisect the fruit but to free, at least in the majority of instances, the pits from the fruit.

A further object of the invention is to provide a simple and novel form of driving means for the conveyor elements of the machine.

Other objects and advantages of the invention will be apparent from the following description taken in conjunction with the drawings forming part of this specification, and in which:

Figure 1 is a top plan view of a fruit halving machine embodying the invention;

Figure 2 is a view in side elevation of the machine of Figure 1, with the outer wall of one of the cutter housings being removed;

Figure 3 is an enlarged view in section taken along lines 3—3 of Figure 1;

Figure 4 is an enlarged view in section taken along lines 4—4 of Figure 1, illustrating the positional relationship between the halving blade and roller-type conveyor elements; and Figure 5 is a detail view in plan of one of the roller-type conveyor elements.

Referring to the drawings for more specific details of the invention, the operating elements of the machine are mounted on a light weight support frame indicated generally at 10 and comprising legs 12, horizontally disposed bracing and connecting members 14 for the legs, and a superstructure framework supported thereby comprising longitudinally extending members 16 and transversely extending members 18. Supported on the frame for rotation is a shaft 20 having fixedly secured thereto a pair of spaced parallel circular plates 22. Tie rods 24 serve to interconnect the plates 22. Journalled for rotation in the plates 22 is a plurality of shafts 26, said shafts having fixedly secured to their outer ends roller-type fruit orienting and conveying elements 28 and 30. The roller elements 28, which are disposed on alternate shafts 26, comprise truncated cones 29 disposed with their apices together to define V-shaped annular surfaces 32. As shown in Figure 5, the truncated apices of the cones are notched to define an annular channel 33 which, in practice, is approximately ¾ of an inch wide. The roller elements 30, which are likewise disposed on alternate shafts 26, are cylindrical in form and extend into the V-shaped channels of roller elements 28. The cylindrical rollers 30 are provided with medially disposed slots 34 to enable their passage past the cutter blades hereinafter described.

Journalled for rotation on frame members 16 is a shaft 36 which has fixedly secured thereto adjacent the ends thereof hub members 38 serving as the supports for annular cutting blades 40. The blades 40 are retained on the hub members 38 by pairs of plates 42 which are secured to the hub members in partially enveloping relation to the blades. The plate members 42 are preferably provided with radially extending arm members 44 having inwardly disposed adjustable studs 46 at their outer ends adapted to serve as guide means to insure that the blades 40 will remain in vertical planes during the fruit halving operation. The cutter blades 40 are disposed in housings 48 which are open at their forward ends to allow the roller members 28 and 39 to carry the fruit to a position to be halved by the knives. The housings 48 are provided with discharge chutes 50 adapted to discharge the halved fruit and the fruit pits onto, for example, horizontally disposed conveyors 52. The blades 40 are peripherally undercut to define bevelled teeth 51.

A water spray system comprising a valve controlled feed line 54 and a closed-end pipe 56 having spray apertures not shown, is provided to maintain the cutter blades 40 in a wet condition during operation.

Shaft 36 and the knife bearing hubs 38 are caused to rotate by a motor 58 mounted on a platform 60 carried by a frame member 18, said motor having an output shaft 62 carrying a sheave 64 in driving relation to a continuous belt 66 which passes over sheave 68 fixedly secured to the shaft 36.

The drum-type roller assembly is bodily rotated by means of power takeoff means connected to shaft 36, said means comprising a sheave 70 secured to shaft 36 and having a belt connection 72 with sheave 74, the latter being secured to the input shaft 76 of a speed reducer unit 78, said reducer having an output shaft 80 provided with a sheave 82 which is in driving engagement with a continuous belt 84 which passes over the rotatable shafts 26. The speed reducer 78 is mounted on a platform 86 secured to a frame member 18. As the belt 84 is moved in frictional engagement with the shafts 26, the drum-like roller assembly is bodily rotated, but the movement of the belt in engagement with the shafts 26 does not cause any rotation of the individual shafts.

The alternately disposed shafts carrying the roller elements 28 are provided with aligned friction wheels 88 which are fixedly secured to the shafts, while the shafts carrying the roller elements 30 are provided with friction wheels 90 fixedly secured thereto. The rollers 28 are adapted to be individually rotated when the friction wheels 88 move in engagement with a friction belt 92 which has its upper end connected to an ear member 94 carried by the frame and its lower end connected by a tension spring 96 to the frame. The rollers 30 are adapted to be individually rotated when the friction wheels 90 associated therewith engage a friction belt 98 having its upper end secured to ear 100 connected to the frame and its lower end secured to tension spring 102 connected to the frame. The ear members 94 and 100 are each provided with a plurality of apertures 104 enabling the variable connection thereto of the friction belts 92 and 98, the connection being made, for example, by anchor bolts 106. This arrangement enables a control of the inception of rotation of the individual rollers and a consequent control of the lengths of the period of rotation of the rollers, while the longitudinal offsetting of the belts 92 and 98 serves to initiate rotation of a roller 30 at the same time the preceding roller 28 begins to rotate.

When the motor 58 is energized, the drum-type roller assembly is rotated in a clockwise direction, as viewed in Figures 2-4, while the cutter blades 40 are rotated in counterclockwise directions, as viewed in Figures 2 and 4. The two operators of the machine hand feed the apricots into the two banks of rollers, with an apricot being deposited in the roller pockets as these pockets move upwarly into the top half of the roller drum circle. A roller 28 constitutes the leading roller of a pocket, while a cylindrical roller 30 constitutes the trailing roller of a pocket-defining roller pair.

The apricots are hand fed into the roller pockets so that their suture lines are disposed in a vertical plane.

As the rollers 28 and the rollers 30 are individually rotated, respectively, by engagement of friction wheels 88 and 90 with friction belts 92 and 98, the rollers are caused to rotate at a relatively rapid rate in a counterclockwise direction, as viewed in Figures 2–4. Counterclockwise rotation of the pocket defining rollers imparts a clockwise rotation to the apricot carried within the pocket due to the fact that the rate of travel of the surfaces of the cylindrical rollers 30 is greater than the rate of travel of the lesser diameter surface portions of rollers 28 contacting the fruit. The apricots are maintained in the desired position of orientation, that is, with their suture lines disposed in a vertical plane, during rotation of the individual pocket defining rollers due to the stable three point support afforded by the V-shaped annular surface of rollers 28 and the cylindrical surface of the rollers 30.

The time of contact between the friction wheels 88 and 90 and the friction belts 92 and 98 is such as to cause the rollers 28 and 30 to rotate the fruit at least through one complete revolution while it is in engagement with cutter blades 40. The individual fruit is thus sliced through to the pit throughout its suture line periphery by the blades 40 which are travelling in the same direction as the fruit at the point of contact therebetween.

The blades 40 are driven at a rapid rate of travel in the normal attitude shown in Figure 4 wherein the frictional point of drive between the hubs 38 and blades 40 is directly above the axis of shaft 36. However, due to the fact that the inside diameter of the blades 40 is greater than the diameter of the hubs 38, the blades are free to swing pendulum-like to the right, as viewed in Figure 4, when they engage the pits of the fruits. The blades swing away under the influence of the pits encountered thereby without causing the flesh of the fruit disposed between the pits and the rollers to be crushed or in any way deformed.

When the cutter blades 40 are urged away from the rollers by the fruit pits, the tendency of the blades is to return to the normal attitude shown in Figure 4, and this tendency results in a slight hammering action on the fruit pits by the blades. It has been found that this hammering action is highly successful in freeing the pits from their ingrown engagement with the flesh of the fruit. In practice, it has been found that when the pocket defining rollers are so positioned with respect to the knife that they move the fruit downwardly in engagement with the lower, or pendulum swinging, half of the cutter blades, that the pit-hammering action provided by the blades, and accentuated by the bevelled teeth 51 formed in the cutting edges thereof and oriented in the direction of advance of the cutter blades, as shown in Figure 4, is effective to completely free from 80% to 90% of the pits from the fruit. This substantially eliminates the expense involved with conventional fruit halving machinery of this general type in removing the pits from the fruit halves by hand. The channels 33 formed in the rollers 28 (Figure 5) are clearance channels for the fruit pits, insuring that the pits will not become wedged between the cones 29 by the hammering action of blades 40 so as to be carried around to the fruit feeding stations.

In connection with the friction belt drive for the drum like roller assembly as a whole, it should be pointed out that this drive arrangement has the particular advantage of being safe as far as the machine operators are concerned. Thus, if an operator should happen to get a hand or an arm in between the shafts 26, or in some other manner be caught by the moving parts of the machine adjacently disposed to the operator, the roller drum can be very easily stopped by hand, as by grasping and holding one of the shafts 26. With relatively little effort the frictional connection between the belt 84 and the shafts 26 can be broken. The belt 84 continues to move in relation to the shafts 26 until the drum is freed for further rotation by the belt.

While a specific embodiment of the invention has been shown and described, it is to be understood that all substantial equivalents thereof are within the spirit and scope of the invention.

What is claimed is:

1. A fruit halving machine comprising a support frame, a horizontally disposed first shaft mounted for rotation on said frame, spaced parallel plates secured to said shaft, a plurality of mutually parallel shafts supported for rotation by said plates, the axes of said shafts being disposed at the surface of an imaginary cylinder, with the axis of said cylinder being the axis of said first shaft, an annular member secured to each of said parallel shafts, said members being in vertical alignment with each other, with successive pairs of said members being formed as to peripheral contour and diameter to constitute fruit conveying pockets adapted upon rotation of the members thereof to impart rotation to fruit carried thereby, a freely suspended annular knife disposed for rotative slicing movement in a vertical plane and located to engage fruit in said pockets as the pockets move downwardly along the upper half of said imaginary cylinder, means for rotating said knife, means for rotating said parallel shafts with reference to the axis of said first shaft comprising a continuous belt extending around said shafts and engaging less than all of said shafts and a driver sheave in engagement with said belt, said belt being free of engagement with said shafts when said shafts are so disposed that the members carried thereby are positionally adapted to engage fruit carried thereby with said knife, and means for rotating said parallel shafts about their own axes when the members carried thereby are positionally adapted to engage fruit carried thereby with said knife, whereby the fruit carried within said pockets will be rotated through at least a complete revolution while in engagement with said knife.

2. A fruit halving machine as set forth in claim 1 wherein said means for rotating said parallel shafts about their own axes comprise sheave members secured to said shafts and a stationary friction belt secured to said support frame adapted to frictionally engage said sheave members.

3. A fruit halving machine as set forth in claim 2 wherein the sheave members of alternate shafts are disposed in one vertical plane and the sheave members of the remaining shafts are disposed in another vertical plane, a stationary friction belt for each group of sheave members, said stationary belts being offset in the direction of their lengths, whereby the annular members of each pocket will begin rotating at substantially the same time.

4. A fruit halving machine comprising a support frame, a freely suspended annular knife carried thereby and means for effecting a rotative slicing movement thereof in a vertical plane, fruit conveying means carried by said frame and operable to move fruit in the plane of said knife into engagement with said knife while maintaining a predetermined rotating attitude of said fruit, said knife and conveying means being so positioned with respect to each other that said conveying means directs fruit downwardly and toward said knife to engage the fruit with the knife at a point on the lower half of the periphery of said knife.

5. A fruit halving machine as set forth in claim 4, said knife being caused to rotate in a direction opposite to the direction of rotation of said fruit so that the knife and the fruit are moving in the same directional sense at their points of contact, and bevelled teeth formed on the periphery of said knife and oriented in the direction of advance of said knife.

6. In an apricot halving machine comprising conveying means for maintaining whole apricots with their sutures in a vertical plane and for rotating them about horizontal axes, and halving mechanism comprising a freely suspended annular knife and means for effecting slicing movement thereof in a substantially vertical plane at a location with respect to said conveying means such as to effect cutting of the meat of a rotating apricot while permitting said suspended knife to move bodily upon encountering the seed thereof: the improvement residing in the orientation of said conveying means with respect to said knife in such manner that said fruit is conveyed downwardly and toward said knife into engagement therewith at a point on the lower half of the periphery of said knife.

7. A machine of the type described comprising a support frame, a pair of spaced parallel plates supported for rotation by said frame, a plurality of spaced parallel shafts journalled for relatively free rotation in said plates and arranged in substantially a cylindrical path, means for rotating said plates without rotating said shafts about their axes comprising a sheave mounted for rotation on said frame and a continuous belt extending around said shafts and said sheave in frictional engagement with said sheave and with less than all of said shafts, and a stationary belt disposed transversely to said shafts and positioned to frictionally engage at least some of those shafts not engaged by said continuous belt to impart a rotative movement of said shafts with respect to the axes thereof.

References Cited in the file of this patent

UNITED STATES PATENTS

| | | |
|---|---|---|
| 553,649 | Harpold | Jan. 28, 1896 |
| 2,057,849 | Sharp | Oct. 20, 1936 |
| 2,100,455 | Souther et al. | Nov. 30, 1937 |
| 2,199,383 | Aurand, Jr. | May 7, 1940 |
| 2,334,416 | Kok | Nov. 16, 1943 |
| 2,434,964 | Rarick | Jan. 27, 1948 |
| 2,577,086 | Magnuson | Dec. 4, 1951 |